(12) United States Patent
Shvodian et al.

(10) Patent No.: US 7,916,736 B2
(45) Date of Patent: Mar. 29, 2011

(54) SYSTEM AND METHOD FOR TRANSLUCENT BRIDGING

(75) Inventors: William M. Shvodian, McLean, VA (US); Joel Z. Apisdorf, Reston, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 824 days.

(21) Appl. No.: 11/529,305

(22) Filed: Sep. 29, 2006

(65) Prior Publication Data
US 2008/0080503 A1    Apr. 3, 2008

(51) Int. Cl.
*H04L 12/28*    (2006.01)
(52) U.S. Cl. ............... 370/395.5; 370/389; 370/392
(58) Field of Classification Search ............. 370/389, 370/392, 396, 395.5, 400
See application file for complete search history.

(56) References Cited

U.S. PATENT DOCUMENTS

| | | | | |
|---|---|---|---|---|
| 4,866,421 A | * | 9/1989 | Szczepanek | 340/825.52 |
| 4,922,503 A | * | 5/1990 | Leone | 370/402 |
| 5,018,133 A | * | 5/1991 | Tsukakoshi et al. | 370/256 |
| 5,408,469 A | * | 4/1995 | Opher et al. | 370/399 |
| 5,732,071 A | * | 3/1998 | Saito et al. | 370/255 |
| 6,028,860 A | * | 2/2000 | Laubach et al. | 370/395.64 |
| 6,219,697 B1 | * | 4/2001 | Lawande et al. | 709/221 |
| 6,718,379 B1 | * | 4/2004 | Krishna et al. | 709/223 |
| 6,798,782 B1 | | 9/2004 | Caronni et al. | |
| 6,870,842 B1 | | 3/2005 | Caronni et al. | |
| 6,938,169 B1 | | 8/2005 | Caronni et al. | |
| 6,970,941 B1 | | 11/2005 | Caronni et al. | |
| 6,977,929 B1 | | 12/2005 | Caronni et al. | |

OTHER PUBLICATIONS

Egevang et al "The IP Network Address Translator" RFC 1631.*
Seifert, Rich. "The Switch Book" 2000 John Wiley & Sons, Inc. pp. xix, xx and 149-150.*
Newton, Harry "Newton's Telecom Dictionary" 2007, Flatiron Publishing, 23rd Edition.*

* cited by examiner

*Primary Examiner* — Dang T Ton
*Assistant Examiner* — Robert M Morlan

(57) ABSTRACT

A network bridge (160) is provided, comprising: a local interface (320) configured to transmit and receive local signals in a local network (305); a bridging interface (325) configured to transmit and receive bridging signals in a bridging network (310); a control circuit (330) configured to pass outgoing local data packets from the local network to the bridging network and to pass incoming bridging payloads from the bridging network to the local network; and an address translation circuit (340) configured to provide the control circuit with address translation data identifying a correspondence between local packet addresses and global packet addresses. The control circuit translates outgoing local addresses to outgoing global addresses (460), and the control circuit translates incoming global addresses to incoming local addresses (560), based on the address translation data.

19 Claims, 5 Drawing Sheets

SYSTEM AND METHOD FOR TRANSLUCENT BRIDGING

FIELD OF THE INVENTION

The present invention relates in general to a system and method for providing translucent bridging between two or more local networks using a bridging network that connects network bridge devices in each local network. In particular the present invention relates to a system and method in which a network bridge device translates addresses between the local networks and the bridging network, allowing devices in a one local network to address devices in all of the different local networks as if they were in a single virtual network.

BACKGROUND OF THE INVENTION

Although wireless networks are becoming more prevalent, many home networks today still rely upon wired networking solutions. But existing wired networks and network infrastructures typically limit their effective operability to a relatively small area, such as a single room in a house. For example, a network using IEEE 1394 connections (also called FireWire) is generally limited to cable lengths of about fifteen feet, which precludes it from easily covering an entire house. Even some wireless solutions may be limited in range if the house is large enough or the coverage of the wireless personal area network or local area network is small enough. This might allow coverage in some, but not all of the rooms in a house.

Furthermore, even when networks that have a longer range are used, the cost or inconvenience of a wired infrastructure can serve to limit the effective coverage of the network. For example, an Ethernet or category 5 (CAT-5) connection has a maximum range between devices of around 300 feet, but the cable still has to be run, and that may be impractical for a number of reasons. Running lengths of cable to every room that requires a connection can be unsightly and inconvenient if the cables are out in the open, and can be expensive if the cables are hidden in walls and ceilings. And while some newer construction is being made that includes an Ethernet or CAT-5 infrastructure, that's still the exception rather than the rule.

As a result, absent a wide-range wireless network, home network users conventionally have separate networks in individual locations throughout a house. A living room might have a stereo connected together with some speakers; a family room might have a television connected with a cable set-top box, a digital video disc (DVD) player, and a digital video recorder (DVR); a bedroom might have another cable set-top box, a television, and a DVD player connected together, and an office might have a computer connected to a printer and cable modem. But each of these networks would be completely separate from the others, and there would be no communication between different local networks (i.e., between different rooms). In other words, the computer in the office could not use the speakers in the living room to play music; the television in the bedroom could not access the DVR in the family room to play recorded content; and each television in the house would have to be connected to its own cable set-top box.

Furthermore, existing cabling solutions (e.g., FireWire, CAT-5, and Ethernet) use point-to-point connections, not bus connections. This means that not only is it necessary to provide long cable runs, it is also necessary to provide the right cable runs. And if a user's needs change, the existing cable connections might not be adequate. Thus, even an integral connection built into a new home might prove inadequate for future needs, again raising the problems of unsightly and inconvenient external runs, or expensive additional internal runs It would therefore be desirable to provide a network that can connect most, if not all of the devices in a house so that all of those devices could talk to each other. It would also be desirable if the network connection had the qualities of a bus, at least in part, so that only a single wired connection between different rooms in the house would be required.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs), and in particular through the use of circuits involving CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Bridging Network

Most existing homes have coaxial cable already laid for cable television or cable modems. Typically this cable is laid between all of the rooms that are most likely to be desirable for smaller room-based networks, e.g., bedrooms, living rooms, family rooms, offices, and the like. And while this coaxial cable system was originally installed simply to distribute cable television or cable modem signals, it can also be used to run a communications network between the connected rooms in the house.

In particular, this existing network connection allows a number of separate local networks to be connected together by a translucent bridging network, allowing each local network to access all of the network components (i.e., devices) in any other local network that is connected to the translucent bridging network. For example, a television in a bedroom local network would be able to contact a digital video recorder in a family room local network, providing that both of the local networks were also connected to the same translucent bridging network.

Figure 1:
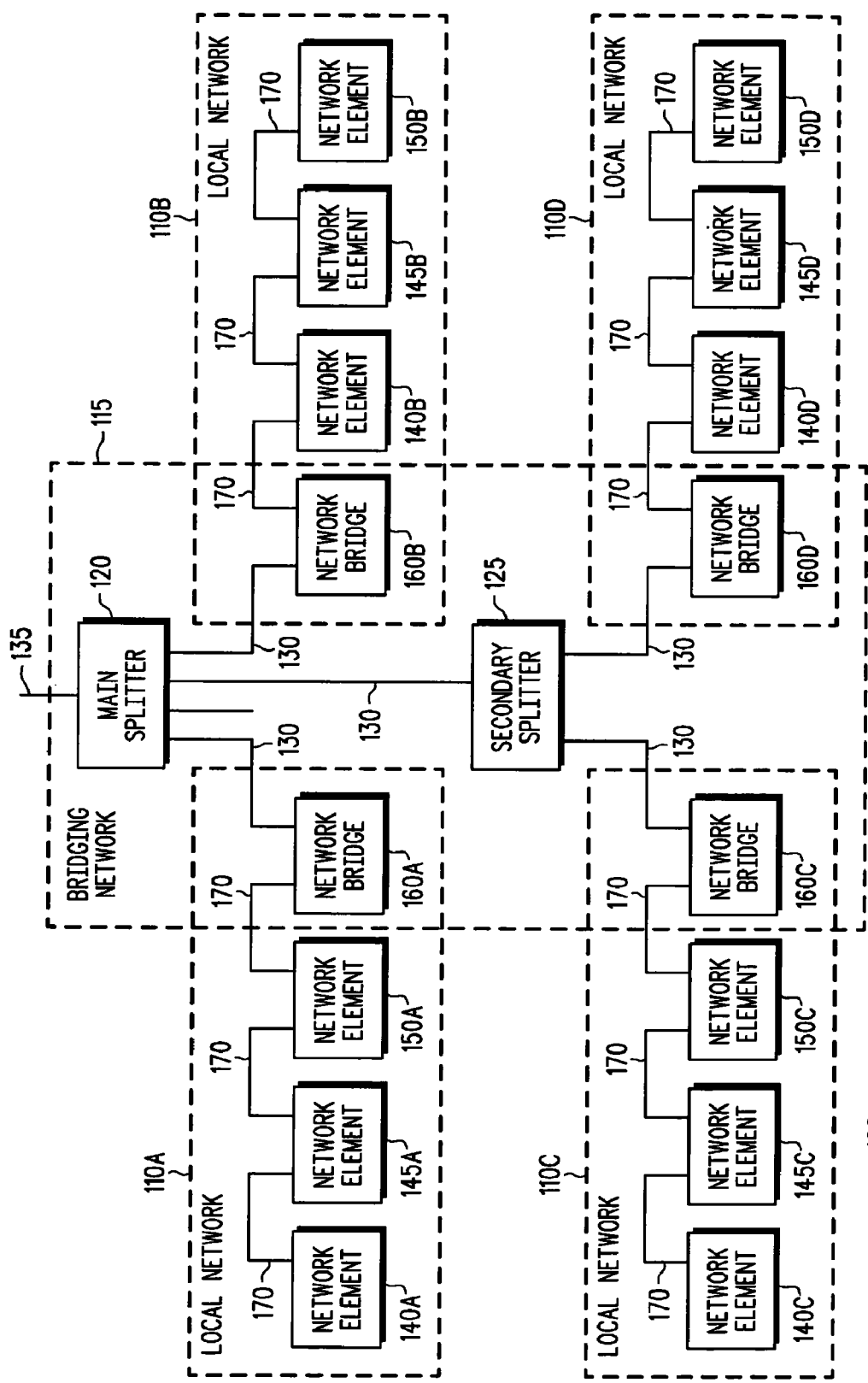
FIG. 1 is a block diagram of a network system including multiple local networks and one bridging network, according to disclosed embodiments.

FIG. 1 is a block diagram of a network system including multiple local networks and one bridging network, according to disclosed embodiments. As shown in FIG. 1, the network system 100 includes four local networks 110A, 110B, 110C, and 110D, each connected to a bridging network 115. The network 110A includes a plurality of network elements 140A, 145A, and 150A, as well as a network bridge 160A; the network 110B includes a plurality of network elements 140B, 145B, and 150B, as well as a network bridge 160B; the network 110C includes a plurality of network elements 140C, 145C, and 150C, as well as a network bridge 160C; and the network 110D includes a plurality of network elements 140D, 145D, and 150D, as well as a network bridge 160D. The bridging network 115 includes a main splitter 120, a secondary splitter 125, and the plurality of network bridges 160A, 160B, 160C, and 160D.

For ease of description, the individual local networks 110A, 100B, 110C, and 110D will sometimes be discussed generally below with reference to an exemplary local network 110. Similarly, the network elements 140A, 145A, 150A, 140B, 145B, 150B, 140C, 145C, 150C, 140D, 145D, and 150D will sometimes be discussed with reference to exemplary network elements 140, 145, and 150, and the plurality of network bridges 160A, 160B, 160C, and 160D will sometimes be discussed with reference to an exemplary network bridge 160.

The main splitter 120 receives an input line 135 that enters the user's home and splits an incoming signal into multiple different streams (typically four or eight) that can be provided over multiple bridging lines 130 to the local networks 10A and 10B, and the secondary splitter 125 in different locations in the house.

The secondary splitter 125 takes one of the bridging lines 130 and splits it into yet more bridging lines 130 that are connected to local networks 110C and 110B. In alternate embodiments additional secondary splitters 125 can be provided, either being connected by a bridging line 130 to the main splitter 120 or by a bridging line 130 to another secondary splitter 125. In still other embodiments, the secondary splitter 125 can be eliminated altogether. As with the main splitter 120, the secondary splitters 125 typically split a received signal into two, four, or eight different streams, though in various embodiments they can split the signal into any number of streams greater than one.

Furthermore, not all of the bridging lines 130 need be connected to a secondary splitter 125 or local networks 110. Some can be connected to network terminators, and others can be left unconnected.

The various local networks 110 will typically be located in different rooms in the house, and represent a plurality of separate networks that each operate under a control protocol that is separate from that of all of the other local networks.

The network elements 140, 145, and 150 in each of the local networks 110 are all devices that could be networked with at least some of the other devices. These could be televisions, stereo components, speakers, DVD players, video cassette recorders (VCRs), digital video recorders, computers, printers, or any other device that a user might wish to be networked together.

In each local network 110, the network elements 140, 145, and 150 are connected together via local lines 170. These local lines 170 can be any sort of appropriate connecting line (e.g., FireWire, Ethernet, CAT-5, etc.). In the embodiment of FIG. 1, the network elements in each network are connected as a daisy chain of local lines 170. However, in alternate embodiments the local lines 170 could all be connected together via a bus, instead of in a daisy chain.

The network bridges 160 are devices that are each connected both to the bridging network 115 by a bridging line 130 and to one of the local networks 110 by a local line 170. Each network bridge 160 is designed to connect the network elements 140, 145, 150 of its home local network 110 with the network elements 140, 145, 150 of one or more remote local networks 110 by passing signals between itself and the network bridge 160 associated with those remote networks 110. It accomplishes this by setting itself forth to the network elements 140, 145, 150 in its own network 110 as a number of virtual network elements that correspond to the network elements 140, 145, 150 in each of the remote local networks 110 connected to the bridging network 115.

In the disclosed embodiments, the network bridges 160 use a transmission protocol that treats the combination of main splitter 120, secondary splitters 125 and bridging lines 130 as a single transmission medium over which data signals can be sent. In some embodiments this can be ultrawide bandwidth (UWB) transmissions sent over a coaxial cable network. In particular, A protocol like IEEE 802.15.3 can be used in the bridging network 115 for connecting the network bridges. This protocol works equally well in a wired medium as in a wireless medium.

If the bridging network 115 is a UWB network, it can generally operate at a frequency high enough that it won't interfere with existing cable television signals being passed over the coaxial cables. And even though the high frequency used for transmission is generally higher than coaxial cable is intended for (e.g., 3-5 GHz signals on lines that were designed for use at below 1 GHz), there will be reflections wherever a cable 130 is not terminated, and the splitters will provide a great deal of signal loss, the UWB network can still provide adequate service. There might be as much as 80 or 90 dB of loss between two network bridges 160. But increased signal power for the transmitted UWB signals can overcome the resulting attenuation and loss.

As a result, the UWB bridging network 115 can use the same cables as the cable television signals without interference, avoiding the need to lay in a separate infrastructure. Thus, a user can enjoy the benefits of the original signal (i.e., watch cable television or use a cable modem), while also enjoying the benefits of having a bridging network 115 that connects local networks 110 throughout the house.

However, in other embodiments any suitable transmission protocol can be used that allows communication between a plurality of network bridges 160 provided there is no undue interference. Some embodiments can also provide a dedicated bridging medium for the bridging network 115.

In some local networks 110 the network bridge 160 can also include the functionality of a network element. For example, the network bridge 160 might be contained within a set-top box. In such a case the network bridge 160 represents itself as a real network element (i.e., the set-top box), as well as all necessary virtual network elements (i.e., all of the network elements in the other local networks 110). Conceptually this is the same as a local network with a network bridge 160 and one network element, except that the network bridge 160 and the network element would be connected by internal connectors rather than a local line 170. In other local networks 110, however, the network bridge 160 can act solely as a conduit. In such a case, the network bridge 160 represents itself only as all necessary virtual network elements.

Using a coaxial cable network to connect local networks 110 in each remote location provides benefits both to an external network provider (e.g., a cable television provider such as a multiple system operator), and an end user (e.g., a cable television subscriber). The network provider gains an advantage in that it can require the use a single tuner in just one the room (i.e., local networks 110) in a given address. That tuner can then communicate its received signals to less complicated network bridges in other rooms (i.e., other local networks 110), thus reducing the equipment costs to the network provider. The end user gains the advantage of being able to have all of the devices in a single house be able to communicate with each other. As a result, a device in one room (i.e., one local network 110) could successfully communicate to with a device in another room (i.e., another local network 110).

Typically, the splitters 120 and 125, and the bridging wires 130 connecting the network bridges 160 are transparent to a user for any infrastructure that's already installed. The splitters 120 and 125 might be stored outside the house or in a closet. All the user knows is that there are connectors at the end of the bridging wires 130 at various points throughout the house that devices can be plugged into to access the wired infrastructure.

When using an existing cable hookup in a home, the input line 135 is the outside coaxial cable connected to a provider's cable network or satellite network, and the bridging lines 130 are all coaxial cables connecting various rooms in the house. In alternate embodiments, however, the bridging lines 130 can be any sort of cable capable of carrying a transmission between the network bridges 160. In embodiments in which a cabled infrastructure without an outside connection is used, the input line 135 can be eliminated, and the splitters 120, 125 can be replaces with network hubs or network switches. In addition, in some embodiments the network bridges 160 can be a wireless network. In this case, the main splitter 120, the secondary splitters 125, and the bridging lines 130 can be eliminated, and the network bridges 160 can pass data wirelessly across the bridging network 115.

Although the network system 100 is shown as having four local networks 110A, 110B, 110C, and 10D, and each local network 110 is shown as having three network elements 140, 145, and 150, this is by way of example only. More or fewer local networks 110 could be connected together. And different local networks 110 can have more or fewer network elements. Some local networks 110 could even have no separate network elements if the network bridge 160 included the functionality of a network element.

Each device in a local network 110 (e.g., an IEEE 1394 network) will have a local network addresses that may be unique within its particular local network 110. However, while these local network addresses may be unique within that particular local network 110, they could be repeated in other local networks 110. Devices in a local network 110 could have their local addresses changed periodically (e.g., at a bus reset), though the newly-assigned local addresses would also have to be unique within that local network 110.

Each device in the bridging network 115 (i.e., the network bridges) will have its own bridging address that is unique within the bridging network. These could be global addresses or they could be unique only within the bridging network 115.

Each device (i.e., network element 140, 145, 150 and network bridge 160) will also have a unique global identifier (e.g., a 64-bit media access control (MAC) address, a node-unique identifier, or the like). These global addresses are assigned to each device and should be unique across all networks.

Virtual Network

Figure 2:
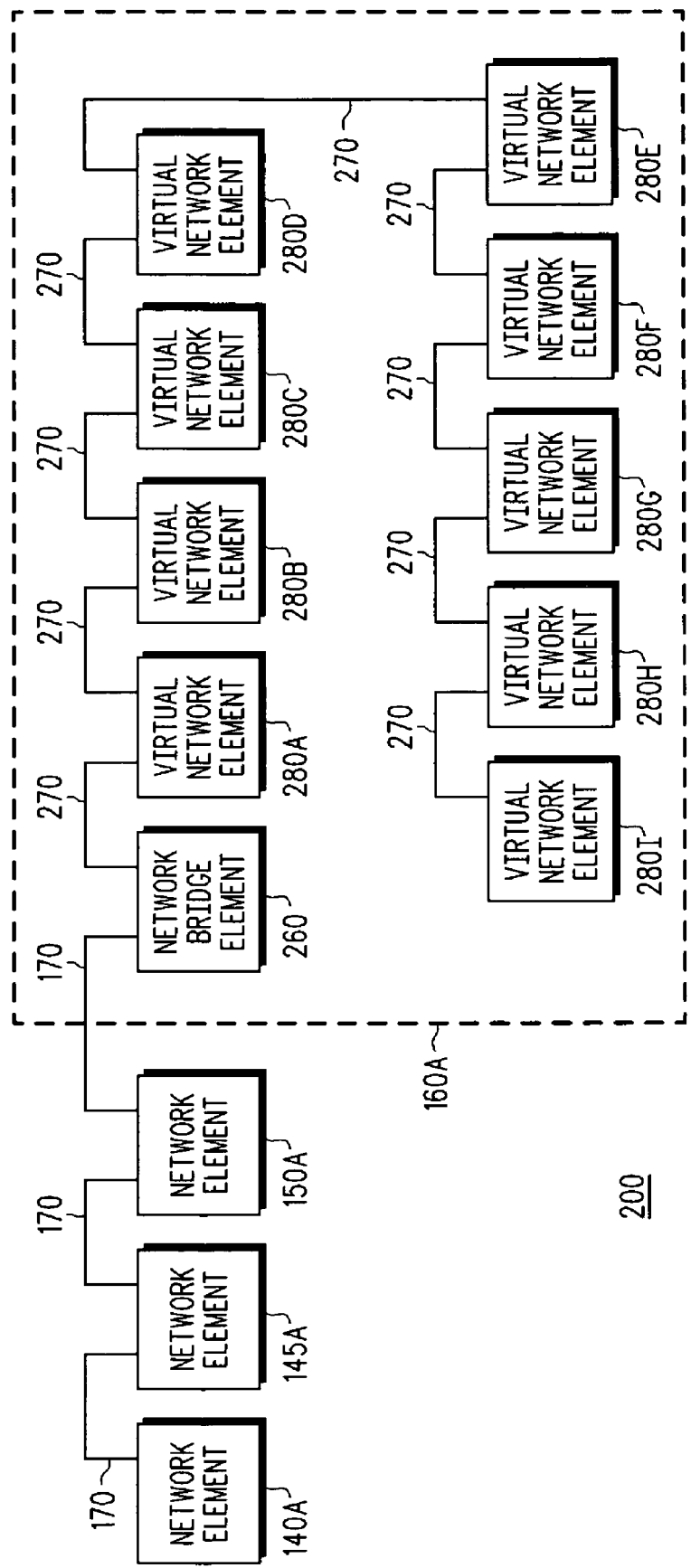
FIG. 2 is a block diagram of a virtual network for the system of FIG. 1, according to disclosed embodiments.

In operation, each network element 140, 145, 150 believes that it is connected in a single virtual network 200 that contains all of the network elements 140, 145, 150 in all of the local networks 110 connected to the same bridging network 115. FIG. 2 is a block diagram of a virtual network for the system of FIG. 1, according to disclosed embodiments.

As shown in FIG. 2, the virtual network 200 includes a network element 140, a network element 145, a network element 150, and a network bridge 160, each connected in a daisy chain by a plurality of local lines 170. The network bridge 160 acts as if it were a network bridge element 260, a virtual network element 280A, a virtual network element 280B, a virtual network element 280C, a virtual network element 280D, a virtual network element 280E, a virtual network element 280F, a virtual network element 280G, a virtual network element 280H, and a virtual network element 280I, all connected in a daisy chain by a plurality of virtual local lines 270. For ease of description, the individual virtual network elements 280A-280I will sometimes be discussed generally below with reference to an exemplary virtual network element 280.

The network elements 140, 145, and 150 correspond to the network elements 140A, 145A, and 150A in the local network 110A, while the network bridge 160 corresponds to the network bridge 160A in the local network 110A.

The network bridge element 260 represents the functionality of a network element contained in the network bridge 160. In alternate embodiments in which the network bridge 160 does not have the functionality of a network element, the network bridge element 260 can be eliminated and the virtual network element 280A connected to the network element 150 by a local line 170.

In the embodiment of FIG. 1, the virtual network element 280A corresponds to the network element 140B in the local network 110B; the virtual network element 280B corresponds to the network element 145B in the local network 10B; the virtual network element 280C corresponds to the network element 150B in the local network 10B; the virtual network element 280D corresponds to the network element 140C in the local network 110C; the virtual network element 280E corresponds to the network element 145C in the local network 110C; the virtual network element 280F corresponds to the network element 150C in the local network 110C; the virtual network element 280G corresponds to the network element 140D in the local network 110D; the virtual network element 280H corresponds to the network element 145D in the local network 110D; and the virtual network element 280I corresponds to the network element 145D in the local network 110D. More generally, each virtual network element 280 corresponds to one of the real network elements 140, 145, 150 in one of the remote local networks 110.

The network bridge 160 operates as if it were connected to the virtual network elements 280 by virtual local lines 270 in a manner that simulates what would happen if the network bridge 160 were connected to real network elements 140, 145, 150 by real local lines 170.

Thus, it appears to the real network elements 140A, 145A, and 150A in the current local network 110A as if they are members of a virtual network that also includes all of the virtual network elements 280 (i.e., all of the network elements 140, 145, and 150 in remote local networks 100B, 110C, and 110D). These other network elements 140, 145, and 150 in the other local networks 110B, 110C, and 110D are in turn part of their own virtual networks 200 in which the network elements 140A, 145A, and 150A are virtual network elements 280.

Each real network element 140A, 145A, and 150A in the current local network 110A can pass local data packets to the network elements 140, 145, 150 that correspond to the virtual network elements 280 in the virtual network 200 by sending the local data packets within the real local network 110A that are addressed to the corresponding virtual network element 280. The network bridge 160A is configured to receive those local data packets and respond as if it were the addressed virtual network element 280. It then forwards the local data packets via the bridging network 115 to the remote network bridges 160 that is in the local network 110 that contains the real network element 140, 145, and 150 that corresponds to the addressed virtual network element 280.

The addressed network bridge 160 in turn forwards the local data packets on to the destination real network element 140, 145, and 150, making it look as if it originated at the virtual network element 280 in the destination virtual network 200 that corresponds to the originating real network element 140A, 145A, or 150A. As far as the originating network element 140A, 145A, or 150A and the destination network element 140, 145, or 150 are concerned, they sent and received their messages within a single local network (i.e., the corresponding virtual local network 200).

Network Bridge

Figure 3:
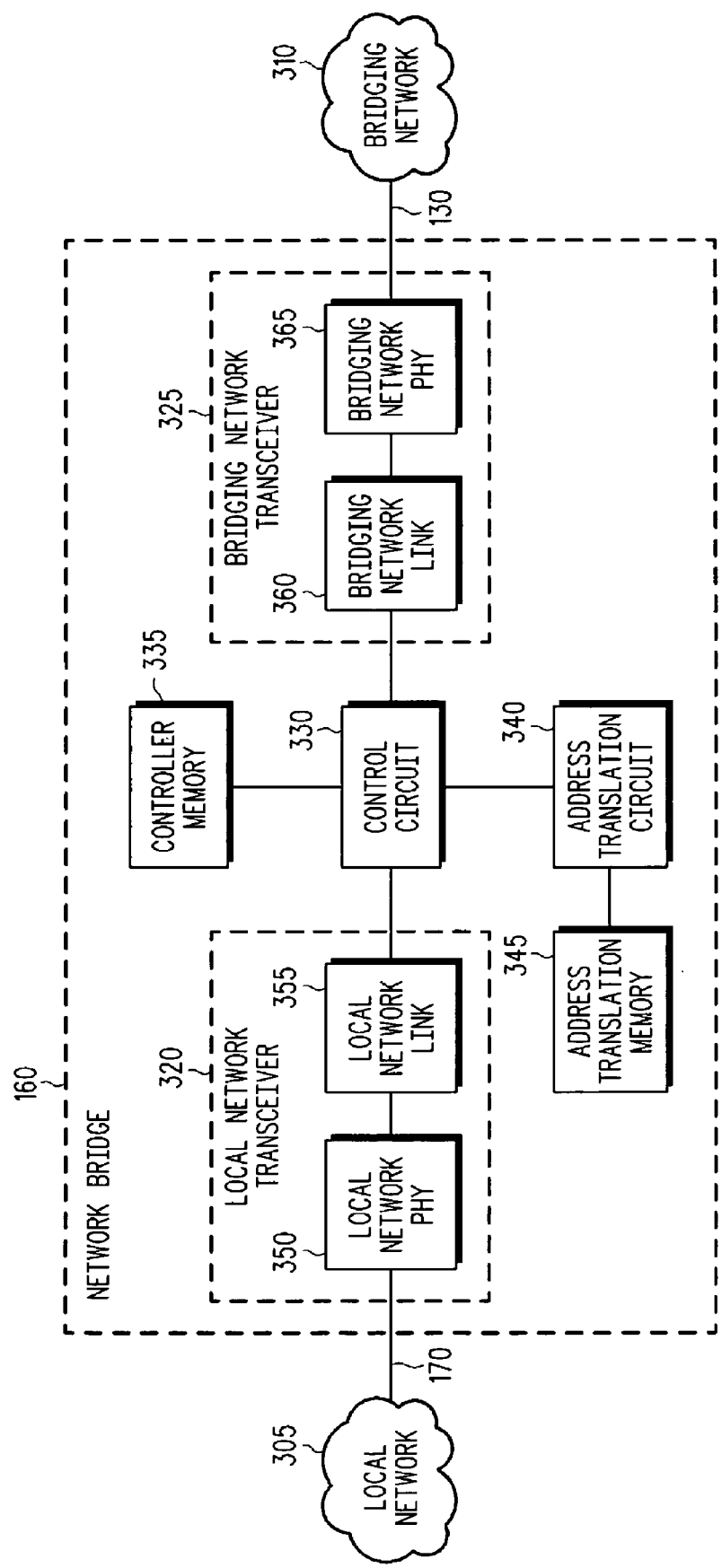
FIG. 3 is a block diagram of a network bridge from FIGS. 1 and 2, according to disclosed embodiments.

FIG. 3 is a block diagram of a network bridge from FIGS. 1 and 2 according to disclosed embodiments. As shown in FIG. 3, the network bridge 160 includes a local network transceiver 320, a bridging network transceiver 325, a control circuit 330, a controller memory 335, an address translation circuit 340, and an address translation memory 345.

The local network transceiver 320 passes messages to and receives messages from a local network 305 via a local line 170. It includes a local network physical (PHY) layer 350 and a local network link layer 355

The local network PHY layer 350 manages the physical connection between the local network transceiver 320 and the local network 305, translating between analog data sent across the local line 170 and digital data used within the network bridge 160.

The local network link layer 355 manages the transfer of digital data between the local network transceiver 320 and the control circuit 330. In some embodiments this can include a media access control (MAC) portion.

The bridging network transceiver 325 passes messages to and receives messages from a bridging network 310 via a bridging line 130. It includes a bridging network physical (PHY) layer 360 and a bridging network link layer 365

The bridging network PHY layer 360 manages the physical connection between the bridging network transceiver 325 and the bridging network 310, translating between analog data sent across the bridging line 130 and digital data used within the network bridge 160.

The bridging network link layer 365 manages the transfer of digital data between the bridging network transceiver 325 and the control circuit 330. In some embodiments this can include a MAC portion.

The control circuit 330 receives local data packets from the local network transceiver 320 and bridging data packets from the bridging network transceiver 325. If a local data packet from the local network transceiver 320 or as a payload in a bridging data packet from the bridging network transceiver 325 is intended for the network bridge 160, the control circuit 330 processes the local data packets appropriately. If a local data packet from the local network transceiver 320 is meant for a virtual network element 280 that the network bridge 160 purports to be, the control circuit 330 passes the local data packet on to the bridging network transceiver 325, and translates its relevant addresses (typically source and destination) so that it will arrive at the proper device in the destination local network 110. If a local data packet received as a payload in a bridging data packet from the bridging network transceiver 325 is meant for a real network element 140, 145, 150 in the local network 110 that the network bridge 160 services, the control circuit 330 passes the local data packet on to the local network transceiver 320, and translates its relevant addresses (typically source and destination) so that it will arrive at the proper network element 140, 145, 150 in the local network 110. The control circuit 330 could be implemented as a central processing unit, dedicated hardware, or the like.

In many data packets the relevant addresses will be a source and destination address, identifying the device where the data packet originated and the device where the data packet will end, respectively. In other embodiments, however, (e.g., when sending isochronous data) the data packets may only have a single address (i.e., a channel number) that needs to get addressed.

The controller memory 335 contains all of the data and instructions necessary for normal operation of the control circuit 330.

The address translation circuit 340 operates to perform all necessary address translation for messages being passed from network elements 140, 145, 150 in the current local network 110 to network elements 140, 145, 150 in a remote local network 110, and messages being passed from network elements 140, 145, 150 in a remote local network 110 to network elements 140, 145, 150 in the current local network 110. In particular, it translates local addresses for virtual network elements 280 into global addresses for their corresponding real network elements 140, 145, 150 in other local networks 110, and it translates global addresses for local real network elements 140, 145, 150 into their corresponding local addresses. Since the global addresses are typically larger than the local addresses, these processes may require address field expansion (for translating from local to global addresses), address field contraction (for translating from global to local addresses), or putting global and local addresses in different address fields.

The local addresses could be any sort of ad hoc address used only within a given local network, e.g., FireWire device identifiers, IEEE 802.15.3 addresses, etc. The global addresses could be any sort of unique identifier that will not repeat for any device within the entire system, e.g., device MAC addresses or a local network identifier-local address pair.

The address translation memory 345 contains the data necessary for performing the required address translation functions. In some embodiments this can include a table of global addresses and corresponding local addresses for all of the network elements in the associated virtual local network 200.

In addition, in some embodiments in which data packets contain a local node identifiers, it may be necessary to have the control circuit 330 look inside the data packets to perform translation of these local node identifiers so that they will be correct.

In general, a network bridge is provided, comprising: a local network interface configured to transmit and receive local signals in a local network according to a local network protocol; a bridging network interface configured to transmit and receive bridging signals in a bridging network according to a bridging network protocol; a control circuit connected between the local network interface and the bridging network interface, configured to pass outgoing local data packets from the local network as outgoing bridging payloads in outgoing bridging data packets to the bridging network and to pass incoming bridging payloads from incoming bridging data packets from the bridging network as incoming local packets to the local network; and an address translation circuit configured to provide the control circuit with address translation data identifying a correspondence between local packet addresses in the local network and global packet addresses. The control circuit translates outgoing local addresses of the outgoing local data packets to outgoing global addresses based on the address translation data, and the control circuit translates incoming global addresses of the incoming local data packets to incoming local addresses based on the address translation data.

The network bridge may further comprise a memory element connected to the address translation circuit and configured to store address translation information. The address translation circuit uses the address translation information to generate the address translation data.

Address translation information may comprise a table of corresponding local network address values and global address values, where the incoming local addresses and the outgoing local addresses are local network address values, and the incoming global addresses and the outgoing global addresses are global network address values. The local network address values may comprise ad hoc local network addresses, and the global addresses may comprise unique global addresses assigned to individual devices.

The local network interface may comprise: a local network physical layer configured to transmit and receive the local signals, to extract the incoming local data packets from received local signals, and to embed the outgoing local data packets into transmitted local signals; and a local link layer configured to pass the outgoing local data packets from the local network physical layer to the control circuit, and configured pass incoming local data packets from the control circuit to the local network physical layer.

The bridging network interface may comprise: a bridging network physical layer configured to transmit and receive the bridging signals, to extract the incoming bridging data packets from received bridging signals, and to embed the outgoing bridging data packets into transmitted bridging signals; and a bridging media access control layer configured to pass the incoming bridging data packets from the bridging network physical layer to the control circuit, and configured pass the outgoing bridging data packets from the control circuit to the bridging network physical layer.

The network bridge may be implemented using one or more integrated circuits.

Translucent Bridging

The disclosed network system 100 operates using a bridging process called translucent bridging. This bridging process allows the bridging to be invisible to the network elements 140, 145, 150 in a local network 110, but visible to the network bridges 160.

When a data packet is sent between devices, it contains at least a destination addresses, and may also contain a source address. The destination address indicates the device (i.e., network element) that it is being sent to; and the source address indicates the device (i.e., network element) that it is being sent from.

In transparent bridging, all addressing is done using addresses that are unique to the entire greater network (i.e., collection of local networks). All data packets, whether sent within a local network or across a bridge use these unique global addresses to identify a source address and a destination address. As a result, no address translation is ever required, since the addresses are valid wherever they appear in the network system. The local data packets remain unchanged throughout the entire bridging process. For example, an IEEE 1394 (FireWire) network could use 1394 node identifiers for addressing provided that they were each unique throughout the greater network.

One problem with transparent bridging is that it requires rapid communication between the networks at certain times (e.g., during a network reset) to coordinate addressing. And many longer-range media (e.g., coaxial cable) won't allow for those short response times. FireWire networks in particular have certain times when response times of several microseconds are required, which would be very difficult, if not impossible in a coaxial network.

In addition, if unique local node identifiers are used for addressing, these will all have to be changed every time any of the busses in the greater network reset. This can cause a significant increase in overhead, since each local network must reset not only when it needs to, but also when any other local network needs to reset.

As a result of this, transparent bridging also runs into the potential problem of bus reset storms in which one local network after another resets, requiring them of the local networks to continually reset, and never allowing data to pass. Long delays in the bridging network could significantly complicate this.

Layer three bridging allows for the addresses of bridging elements to be added on top of an existing source-destination address pair to facilitate the routing of a packet through a bridge network. But the bridging process never performs any address translation at all, retaining the original source-destination address pair. Furthermore, no network element ever pretends to be any device other than who it actually is.

In contrast to this, translucent bridging translates a packet address pair (or single address) from one local addressing scheme to a global addressing scheme and then to another local addressing scheme as it passes from a device in one local network 110 to a device in another local network 110. Thus, the local data packet address is translated twice. First the translucent bridging process translates the local data packet address pair (or single address) from the local addressing scheme of the local network containing the source network element to the global addressing scheme. The local data packet is then routed across the bridging network 115 to a local network 110 containing the destination address, where the local data packet address pair (or single address) is translated from the global addressing scheme to the local addressing scheme of the local network 110 containing the destination network element.

In this translucent bridging process, the global address must be unique for all network elements in all of the local networks 110. However, the local addresses need only be consistent within a given local network 110 and can be reused in other local networks 110 without concern over whether their assignment conflicts with the address assignments in other local networks 110.

In addition, each network bridge 160 must act as if it were multiple network elements. To the local network 110 with which it is directly connected, each network bridge 160 has to act as if it were itself as well as all of the network devices 140, 145, 150 contained in all of the other local networks 110 connected to the bridging network 115. And to the bridging network 115, each network bridge 160 has to act as if it is its own device 160, as well as the network devices 140, 145, 150 contained in the local network 110 with which it is directly connected. In operation, the network bridge 160 sends local data packets with different source addresses, and receives local data packets with different destination addresses.

The network bridge 160 of FIG. 3 can use the address translation circuit 340 and the information in the address translation memory 345 (e.g., a table of matched local address and global address pairs) to perform these address translations. In particular, the address translation circuit 340 can use this address translation information to convert a received pair of source-destination local addresses into a proper pair of source-destination global addresses, and vice versa.

In some embodiments it is also possible to aggregate multiple local data packets into a single payload to create larger bridging packets. This can offer greater efficiencies by allowing longer preambles for the bridging packets, while making the length of the bridging payload large as compared to the bridging packet overhead. If this is done, it will generally be advantageous to aggregate local data packets that are being sent to the same local network 110, though it is not required that the aggregated local data packets in a single bridging packet be addressed to the same network element.

Translucent bridging also provides the advantage that since the addressing of the local data packets when they pass through the bridging network uses only global addresses, it is independent of any local addressing scheme. The only device that needs to worry about the local addresses of virtual devices 280 is the network bridge 160 that purports to be those virtual devices 280, since it is the only device that ever has to translate addresses for those virtual devices. All of the network elements 140, 145, 150 will believe that they are part of a single local network 110, which means that no additional circuitry or firmware is required to perform the bridging process, and so existing devices can be used.

Translucent bridging also avoids the problem of network resets noted above. When an individual local network 110 in this network system 100 has to perform a reset operation, only the local bus in that local network 110 needs to reset. The network bridge 160 associated with that local network 110 responds for itself and all of the virtual network elements 280 it purports to be (i.e., all of the other real network elements in the other local networks 110). Devices on other local network 110 won't see this reset process since they only see their own virtual network 200. Their data packet addressing will occur within this virtual network 200 and will operate as if all of the network elements 140, 145, 150, 280 were physically in the same local network 110.

The only thing that has to be communicated between network bridges 160 is when the network topology changes (i.e., when a current network element leaves a local network 110 or a new network element joins a local network 110). This is so that the network bridges 160 can each maintain a valid list of virtual network elements they must each purport to be, along with a valid global address for the real network element that corresponds to each of these virtual network elements. So long as the number of network elements isn't changing, the actual addressing used in a given local network 110 is unimportant to the other local networks 110.

Operation of the Network Bridge

Figure 4:
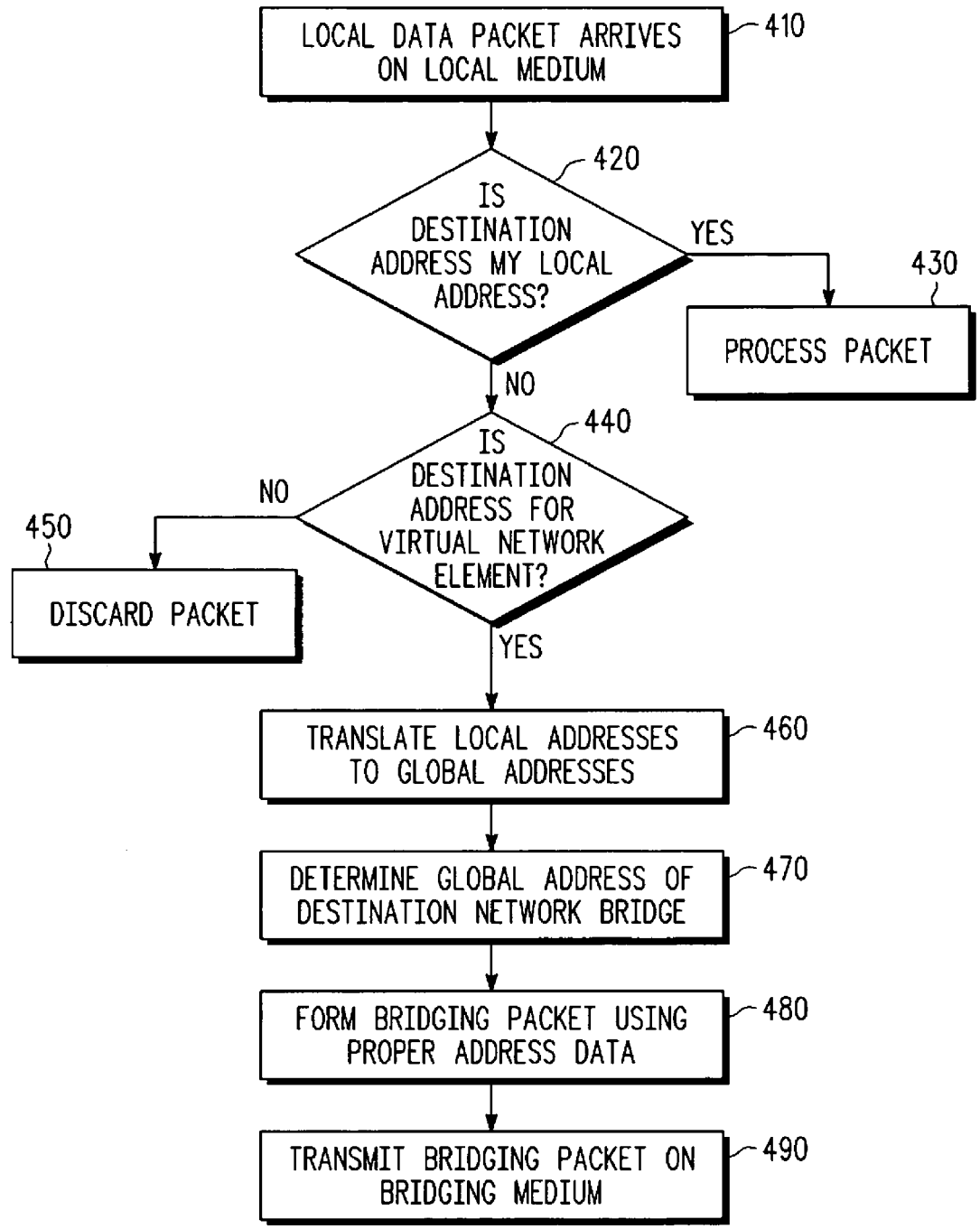
FIG. 4 is a flow chart showing the operation of a network bridge of FIGS. 1-3 upon receiving a local data packet from a local network, according to disclosed embodiments.

FIG. 4 is a flow chart showing the operation of a network bridge of FIGS. 1-3 upon receiving a local data packet from a local network, according to disclosed embodiments.

As shown in FIG. 4, the bridging operation 400 starts when a local data packet arrives at the network bridge 160 on a local medium (i.e., from the local network 110 in which the network bridge 160 is directly connected). (410) In a wired local network 110, this local medium is a local line 170. If the local network 110 were a wireless network, however, the local medium will be a wireless channel.

The network bridge 160 first determines whether a destination address for the local data packet is the local address of the network bridge 160. (420) If it is, the network bridge 160 then proceeds to process the local data packet appropriately. (430) Typically this will happen when the network bridge 160 also has the functionality of a network element (e.g., if the network bridge 160 also serves as a set-top box for cable television).

If the destination address for the incoming data packet is not the local address of the network bridge 160, the network bridge 160 then determines whether it is the local address of any of the virtual network elements 280 that the network bridge 160 purports to be (i.e., any of the real network elements 140, 145, 150 from other local networks 110 connected to the bridging network 115). (440)

If the destination address for the incoming data packet is not the local address of any of the of the virtual network elements 280 that the network bridge 160 purports to be, the network bridge 160 will discard the local data packet. (450) In this situation, the local data packet is most likely addressed to another network element 140A, 145A, 150A in the local network 110A.

If, however, the destination address for the incoming local data packet is the local address of one of the of the virtual network elements 280 that the network bridge 160 purports to be, the network bridge 160 will translate any appropriate local addresses in the local data packet to their corresponding global addresses. (460) If the local data packet uses a single address (e.g., a destination address or channel number), the network bridge 160 will only have to translate that single address. But if the local data packet uses two addresses (e.g., both a source address and a destination address), the network bridge 160 will have to translate both addresses.

As shown by elements 420 and 440, the network bridge 160 will therefore accept and handle local data packets from the local network 110 that are addressed to either itself or any of the virtual network elements 280 that it purports to be. In operation, each network bridge 160 thus acts as if it were multiple devices (i.e., network elements 140, 145, 150).

In some embodiments, once the local addresses are translated to global addresses, the network bridge 160 will have to determine a bridging destination address for the network bridge 160 that corresponds to the network containing the network element 140, 145, 150 identified by the global destination address in the local data packet. (470) This would be necessary if the bridging network 115 requires that bridging data packets be addressed between specific network bridges 160. In this case, the bridging destination address could be a unique global identifier for the destination network bridge 160, or it could be an address used specifically within the bridging network for addressing.

In other embodiments, however, the individual network bridges 160 could each accept bridging data packets addressed by a unique global address to any of the network elements 140, 145, 150 contained in their local network 110, allowing bridging data packets to be sent over the bridging network 115 addressed to any network element 140, 145, 150, or network bridge 160 in any of the local networks 110. In such a case, the global destination addresses associated with the local data packet could be used as bridging destination addresses in the bridging network, and no separate bridging destination address for a network bridge need be determined.

Once it has all of the address information it requires, the network bridge 160 then forms a bridging data packet using the protocol used by the bridging network 115, and using whatever destination address is appropriate. (480) In one embodiment this could be the bridging address of a destination network bridge (and possibly the bridging address of the source network bridge 160). In another embodiment this could be the global address of the destination network element 140, 145, 150 (and possibly the global address of the source network element 140, 145, 150).

Finally, the network bridge 160 transmits the bridging data packet over the bridging line 130 to the bridging network 115. (490)

Figure 5:
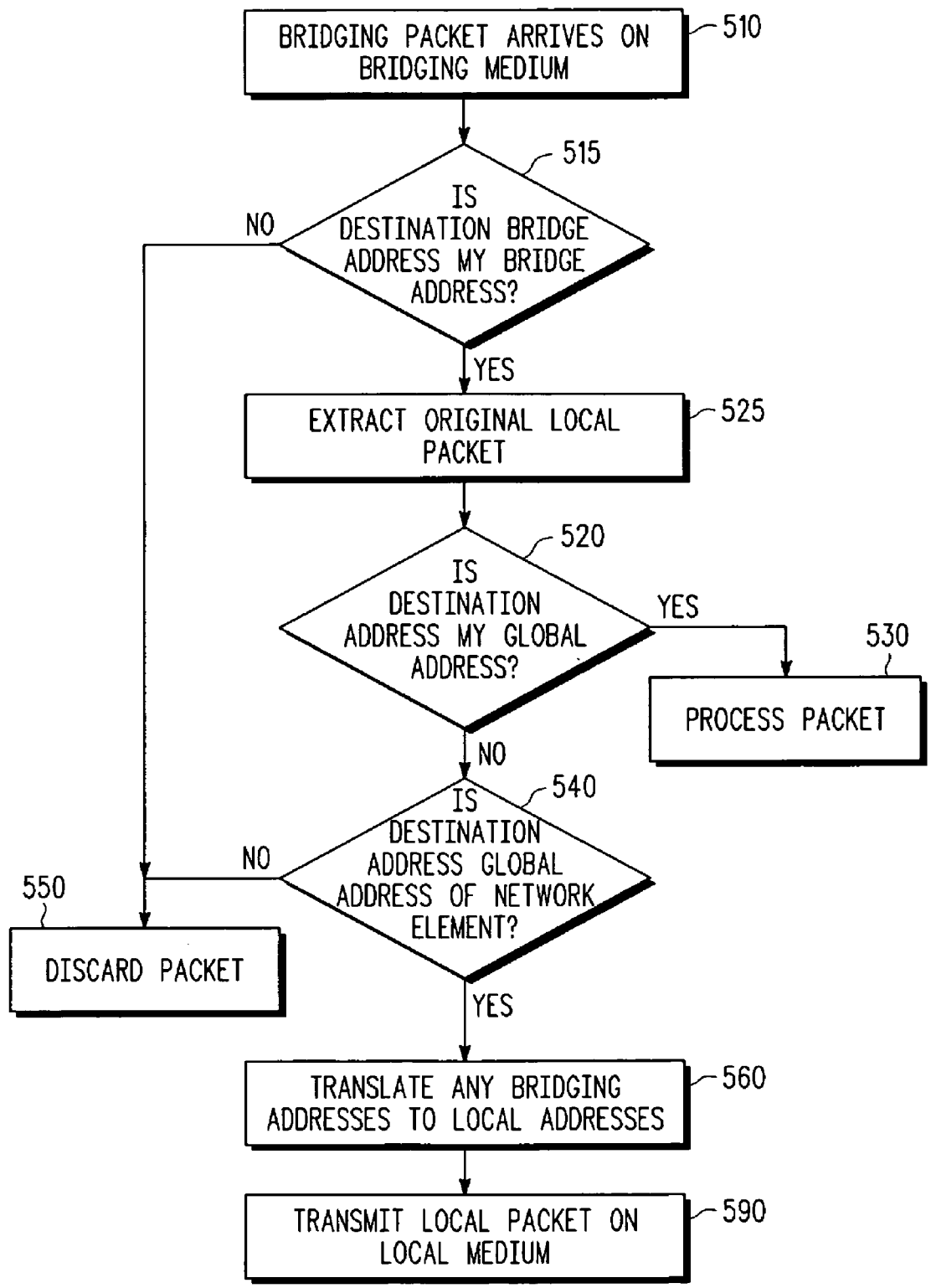
FIG. 5 is a flow chart showing the operation of a network bridge of FIGS. 1-3 upon receiving a bridging data packet from a bridging network, according to disclosed embodiments.

FIG. 5 is a flow chart showing the operation of a network bridge of FIGS. 1-3 upon receiving a bridging data packet from a bridging network, according to disclosed embodiments.

As shown in FIG. 5, the bridging operation 500 starts when a bridging data packet arrives at a network bridge 160 on a bridging medium (i.e., from the bridging network 115 in which the network bridge 160 is directly connected). (510) In a wired bridging network 115, this bridging medium is a bridging line 130. If the bridging network 115 were a wireless network, however, the bridging medium will be a wireless channel.

The network bridge 160 first determines whether a destination bridging address for the bridging data packet is the address of the network bridge 160. (515) If it isn't, the network bridge 160 discards the bridging data packet. (550)

If the destination bridging address for the bridging data packet is the address of the network bridge 160, the network bridge 160 then extracts the local data packet (525) and proceeds to examine the destination global address of that local data packet to see if it corresponds to the global address of the network bridge 160. (520)

If it does, the network bridge 160 then proceeds to process the local data packet appropriately. (530) Typically this will happen when the network bridge 160 also has the functionality of a network element (e.g., if the network bridge 160 also serves as a set-top box for cable television).

If the destination global address of the local data packet does not correspond to the global address of the network bridge 160, the network bridge 160 determines whether it corresponds to the global address of any of the network elements 140, 145, 150 in the current local network 110. (540)

If the destination global address for the local data packet is not the global address of any of the of the network elements 140, 145, 150 in the current local network 110, the network bridge 160 will discard the local data packet. (550)

If, however, the destination global address for the local data packet is the global address of one of the of network elements 140, 145, 150 in the current local network 110, the network bridge 160 will translate any appropriate global addresses in the local data packet to their corresponding local addresses. (560) If the local data packet uses just a destination address, the network bridge 160 will only have to translate that destination address. But if the local data packet uses a source address and a destination address, the network bridge 160 will have to translate both the source and destination addresses.

Finally, once the addresses are all properly translated in the local data packet, the network bridge 160 transmits the local data packet over the local line 170 to the local network 110. (590)

In some embodiments the bridging packet could be addressed using global addresses of the ultimate destination network element 140, 145, 150. In this case, the process of determining whether the destination bridging address identifies the network bridge 160 would instead be a determination as to whether the destination bridging address identifies the network bridge 160 or any of the network elements 140, 145, 150 in the local network 110 that the network bridge 160 services.

In some embodiments the operation of determining whether the destination bridging address identifies the network bridge 160 could also include determining whether the incoming global data packet even has an embedded local data packet at all. It may be that in some cases the global data packet could just be a management data packet for operating the bridging network 115. In that case the operation of determining whether the destination bridging address identifies the network bridge 160 could more broadly determine whether the later operations needed to be performed at all.

Although the description above describes embodiments in which local networks in different rooms at a single address are linked through an existing wired or wireless infrastructure, the general idea can be extended to any situation in which it is desirable to link together multiple networks that for some reason cannot be consolidated into a single network.

In general, a method of processing a local data packet from a local network through a network bridge, is provided, comprising: receiving the local data packet at the network bridge on a local medium, the local data packet including a local identifier and a local payload; determining whether the local identifier identifies a destination device selected from one or more known devices that are not in the local network; translating the local identifier to a global identifier if the local identifier identifies a destination device selected from one or more known devices that are not in the local network; forming a bridging packet including a local data packet as a bridging payload after translating the local identifier; and sending the bridging packet over a bridging medium. The local and bridging identifiers are both contained within a data link layer.

The method may further comprise discarding the local data packet if the local identifier does not identify the destination device selected from one or more known devices that are not in the local network.

The method may further comprise: determining whether the local identifier identifies the network bridge; processing the local data packet in the network bridge if the local identifier identifies the network bridge; and discarding the local data packet if the local identifier does not identify the destination device selected from one or more known devices that are not in the local network and does not identify the network bridge.

The local medium may be one of: an Institute of Electrical and Electronics Engineers (IEEE) 1394 bus, a coaxial cable, and a wireless transmission medium. Likewise, the bridging medium may be one of: an IEEE 1394 bus, a coaxial cable, and a wireless transmission medium.

The determining may be performed by comparing the local identifier with a plurality of known identifiers stored in a memory device.

The translating may be performed by accessing a table including a plurality of identifier pairs stored in a memory, each of the plurality of identifier pairs including a local device address and a global device address. In this case, each of the local device addresses is local address generated by the local network, and each of the global device addresses is either a unique global address, or a bridge-local address pair, the bridge-local address pair including a bridge address identifying a network bridge and a remote address identified by a non-local network.

The method may be implemented using one or more integrated circuits.

A method is also provided of processing a bridging packet from a bridging network through a local network bridge in a local network, comprising: receiving the bridging packet at the local network bridge on a bridging medium, the bridging packet containing a local data packet as a bridging payload; extracting a local data packet from the bridging packet, the local data packet including a global address and a local payload; determining whether the global identifier identifies a destination device in the local network; translating the global identifier to a local identifier if the global identifier identifies a destination in the local network; and sending the local data packet over a local medium after translating the global identifier.

The method may further comprise discarding the local data packet if the global identifier does not identify the destination device in the local network.

The method may further comprise: determining whether the global identifier identifies the network bridge; processing the local data packet in the network bridge if the global identifier identifies the network bridge; and discarding the local data packet if the global identifier does not identify the destination device in the local network and does not identify the network bridge.

The determining may be performed by comparing the global identifier with a plurality of known identifiers stored in a memory device.

The translating may be performed by accessing a table including a plurality of identifier pairs stored in a memory, each of the plurality of identifier pairs including a local device address and a global device address. In this case, each of the local device addresses is local address generated by the local network, each of the global device addresses is either a unique global address, or a bridge-local address pair, and wherein the bridge-local address pair includes a bridge address identifying a network bridge and a remote address identified by a non-local network.

The method may be implemented using one or more integrated circuits.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A network bridge, comprising:
    a local network interface configured to transmit and receive local signals in a local network according to a local network protocol;
    a bridging network interface configured to transmit and receive bridging signals in a bridging network according to a bridging network protocol;
    a control circuit connected between the local network interface and the bridging network interface, configured to pass outgoing local data packets from the local network as outgoing bridging payloads in outgoing bridging data packets to the bridging network and to pass incoming bridging payloads from incoming bridging data packets from the bridging network as incoming local packets to the local network; and
    an address translation circuit configured to provide the control circuit with address translation data identifying a correspondence between local network addresses in the local network and global network addresses,
    wherein the control circuit translates outgoing local addresses of the outgoing local data packets to outgoing global addresses based on the address translation data,
    wherein the control circuit translates incoming global addresses of the incoming local data packets to incoming local addresses based on the address translation data,
    wherein the network bridge functions as one of a plurality of network elements in the local network, and has a unique local network address,
    wherein the local network addresses are ad hoc addresses, and
    wherein the local network protocol is configured to periodically change an assignment of the local network addresses to the plurality of local network elements in the local network.

2. The network bridge of claim 1, further comprising
    a memory element connected to the address translation circuit and configured to store address translation information,
    wherein the address translation circuit uses the address translation information to generate the address translation data.

3. The network bridge of claim 2,
    wherein address translation information comprises a table of corresponding local network addresses and global network addresses,
    wherein the incoming local addresses and the outgoing local addresses are local network addresses, and
    wherein the incoming global addresses and the outgoing global addresses are global network addresses.

4. The network bridge of claim 3,
    wherein the global network addresses comprise unique global network addresses assigned to individual devices.

5. The network bridge of claim 1, wherein the local network interface comprises:
    a local network physical layer configured to transmit and receive the local signals, to extract the incoming local data packets from received local signals, and to embed the outgoing local data packets into transmitted local signals; and a local link layer configured to pass the outgoing local data packets from the local network physical layer to the control circuit, and configured pass incoming local data packets from the control circuit to the local network physical layer.

6. The network bridge of claim 1, wherein the bridging network interface comprises:

a bridging network physical layer configured to transmit and receive the bridging signals, to extract the incoming bridging data packets from received bridging signals, and to embed the outgoing bridging data packets into transmitted bridging signals; and a bridging media access control layer configured to pass the incoming bridging data packets from the bridging network physical layer to the control circuit, and configured pass the outgoing bridging data packets from the control circuit to the bridging network physical layer.

7. The network bridge of claim 1, wherein the network bridge is implemented using one or more integrated circuits.

8. The network bridge of claim 1,
wherein the local network addresses are repeated as remote network addresses in a remote network connected to the network bridge.

9. The network bridge of claim 1,
wherein the local network addresses are one of: FireWire device identifiers and IEEE 802.15.3-2003 addresses.

10. The network bridge of claim 1,
wherein the local network addresses are assigned by the local network.

11. A method of processing a local data packet from a local network through a network bridge, comprising:

receiving the local data packet at the network bridge on a local medium, the local data packet including a local identifier and a local payload;

determining whether a destination device identified by the local identifier is a local destination device in the local network, is the network bridge, or is a known remote device that is not in the local network;

sending the local data packet over the local medium if the local identifier identifies the local destination device;

processing the local data packet in the network bridge if the destination device identified by the local identifier is the network bridge;

translating the local identifier to a global identifier if the local identifier identifies a destination device selected from one or more known devices that are not in the local network;

forming a bridging packet including a local data packet as a bridging payload after translating the local identifier;

sending the bridging packet over a bridging medium after forming the bridging packet;

discarding the local data packet if the destination device identified by the local identifier is not a local destination device in the local network, is not a known remote device that is not in the local network, and is not the network bridge, and periodically changing an assignment of the local identifiers to the local device, the network device, and the known remote device, wherein the local identifiers are ad hoc identifiers.

12. The method of claim 11, wherein the local and bridging identifiers are both contained within a data link layer.

13. The method of claim 11, further comprising discarding the local data packet if the local identifier does not identify the destination device selected from one or more known devices that are not in the local network.

14. The method of claim 11, wherein the determining is performed by comparing the local identifier with a plurality of known identifiers stored in a memory device.

15. The method of claim 11, wherein the translating is performed by accessing a table including a plurality of identifier pairs stored in a memory, each of the plurality of identifier pairs including a local device address and a global device address.

16. The method of claim 15,
wherein each of the local device addresses is local address generated by the local network,
wherein each of the global device addresses is either a unique global address, or a bridge-local address pair, and
wherein the bridge-local address pair includes a bridge address identifying a network bridge and a remote address identified by a non-local network.

17. The method of claim 11, wherein the method is implemented using one or more integrated circuits.

18. The method of claim 11,
wherein the local identifiers are repeated as remote network identifiers in a remote network connected to the network bridge.

19. The method of claim 11,
wherein the local identifiers are one of: FireWire device identifiers and IEEE 802.15.3 addresses.

* * * * *